US007291394B2

(12) United States Patent
Winkler et al.

(10) Patent No.: US 7,291,394 B2
(45) Date of Patent: *Nov. 6, 2007

(54) COMPOSITE MATERIAL CONTAINING A CORE-COVERING PARTICLE

(75) Inventors: Holger Winkler, Darmstadt (DE); Guenther Vulpius, Riedstadt (DE); Tilmann Ruhl, Griesheim (DE); Goetz Hellmann, Mainz (DE); Harald Doerr, Messel (DE)

(73) Assignee: Merck Patent GmbH, Darmstadt (DE)

( * ) Notice: Subject to any disclaimer, the term of this patent is extended or adjusted under 35 U.S.C. 154(b) by 11 days.

This patent is subject to a terminal disclaimer.

(21) Appl. No.: 10/518,058

(22) PCT Filed: May 19, 2003

(86) PCT No.: PCT/EP03/05225

§ 371 (c)(1),
(2), (4) Date: Dec. 16, 2004

(87) PCT Pub. No.: WO03/106557

PCT Pub. Date: Dec. 24, 2003

(65) Prior Publication Data

US 2005/0228072 A1    Oct. 13, 2005

(30) Foreign Application Priority Data

Jun. 17, 2002   (DE) ................................ 102 27 071

(51) Int. Cl.
*B32B 5/16* (2006.01)
(52) U.S. Cl. .................. 428/403; 428/407; 428/212; 523/201
(58) Field of Classification Search ............... 428/403, 428/407, 212; 523/201
See application file for complete search history.

(56) References Cited

U.S. PATENT DOCUMENTS

| 3,138,475 | A |   | 6/1964  | Schröder et al. |
|-----------|---|---|---------|-----------------|
| 3,258,349 | A |   | 6/1966  | Scott           |
| 3,497,367 | A |   | 2/1970  | Gaskin et al.   |
| 4,391,928 | A |   | 7/1983  | Weier et al.    |
| 4,608,307 | A |   | 8/1986  | Nakano et al.   |
| 4,703,020 | A |   | 10/1987 | Nakano et al.   |
| 4,911,903 | A |   | 3/1990  | Unger et al.    |
| 5,026,782 | A | * | 6/1991  | Biale ............. 525/317 |
| 5,053,441 | A | * | 10/1991 | Biale ............. 523/201 |
| 5,273,824 | A |   | 12/1993 | Hoshino et al.  |
| 5,344,489 | A |   | 9/1994  | Matijevic et al.|
| 5,618,872 | A |   | 4/1997  | Ludwig et al.   |
| 5,756,211 | A |   | 5/1998  | Ittmann et al.  |
| 5,846,310 | A |   | 12/1998 | Noguchi et al.  |
| 5,932,309 | A |   | 8/1999  | Smith et al.    |
| 6,254,831 | B1|   | 7/2001  | Barnard et al.  |
| 6,276,214 | B1|   | 8/2001  | Kimura et al.   |
| 6,303,055 | B1|   | 10/2001 | Yamada et al.   |
| 6,337,131 | B1| * | 1/2002  | Rupaner et al. ............ 428/403 |
| 6,689,832 | B1|   | 2/2004  | Rostami         |
| 6,751,022 | B2|   | 6/2004  | Phillips        |
| 6,756,115 | B2|   | 6/2004  | Fu et al.       |
| 6,780,647 | B2|   | 8/2004  | Fujiwara et al. |
| 6,818,051 | B2|   | 11/2004 | Albrecht et al. |
| 6,841,238 | B2|   | 1/2005  | Argoitia et al. |
| 6,863,847 | B2|   | 3/2005  | Fu et al.       |
| 6,875,808 | B2|   | 4/2005  | Weier et al.    |
| 6,881,787 | B2|   | 4/2005  | Weier et al.    |
| 2001/0019037 | A1 |   | 9/2001  | Zakhidov et al. |
| 2003/0116062 | A1 |   | 6/2003  | Anselmann et al.|
| 2004/0253443 | A1 |   | 12/2004 | Anselmann et al.|
| 2004/0262790 | A1 |   | 12/2004 | Fu et al.       |
| 2005/0142343 | A1 |   | 6/2005  | Winkler et al.  |
| 2005/0145037 | A1 |   | 7/2005  | Winkler et al.  |
| 2005/0228072 | A1 |   | 10/2005 | Winkler et al.  |
| 2006/0002875 | A1 |   | 1/2006  | Winkler et al.  |

FOREIGN PATENT DOCUMENTS

| DE | 10145450.3    | 9/2001 |
| DE | 102 04 338    | 2/2002 |
| EP | 0 141 388 A2  | 5/1985 |
| EP | 0469336       | 7/1991 |
| EP | 0441559       | 8/1991 |
| EP | 0644914       | 3/1995 |
| EP | 0955323       | 5/1999 |

(Continued)

OTHER PUBLICATIONS

U.S. Appl. No. 10/529,793, filed Mar. 30, 2005, Holger Winkler et al.

(Continued)

*Primary Examiner*—Leszek Kiliman
(74) *Attorney, Agent, or Firm*—Millen, White, Zelano & Branigan, P.C.

(57) ABSTRACT

The invention relates to composite materials having an optical effect, comprising at least one moulding which essentially consists of core/shell particles whose shell forms a matrix and whose core is essentially solid and has an essentially monodisperse size distribution, where a difference exists between the refractive indices of the core material and of the shell material, and at least one further material which determines the mechanical properties of the composite, and to a process for the production of the composite materials. The materials according to the invention exhibit a viewing angle-dependent colour effect with freely adjustable mechanical properties.

22 Claims, No Drawings

FOREIGN PATENT DOCUMENTS

| | | |
|---|---|---|
| EP | 1 285 031 | 6/2003 |
| JP | 03 257081 | 11/1991 |
| WO | WO93/08237 | 4/1993 |
| WO | WO 3/25611 | 12/1993 |
| WO | WO 0012960 | 3/2000 |
| WO | WO 00/21905 | 4/2000 |
| WO | WO 01/86038 | 11/2001 |
| WO | WO 01/88044 | 11/2001 |
| WO | WO 03025035 | 3/2003 |

OTHER PUBLICATIONS

U.S. Appl. No. 60/253,932, filed Nov. 30, 2000, Guoyi Fu et al.
U.S. Appl. No. 60/211,464, filed Jun. 15, 2000, Guoyi Fu et al.
Chemical Abstracts, Bd. 116, Nr. 10, Mar. 9, 1992, Columbus, Ohio, seite 399.

* cited by examiner

COMPOSITE MATERIAL CONTAINING A CORE-COVERING PARTICLE

The invention relates to composite materials having an optical effect and to a process for the production of the composite materials.

Polymeric core/shell particles have been recommended for the production of adhesives, binder systems, in particular also as reinforcing materials in the production of certain groups of composite materials. Composite materials of this type consist of a plastic matrix and reinforcing elements embedded therein. One problem in the production of materials of this type consists in the production of a positive connection between the matrix material and reinforcing material. Only if such a connection exists can forces be transferred from the matrix to the reinforcing elements. The more the mechanical properties of the matrix material and reinforcing material, elasticity, hardness and deformability, differ from one another, the greater the risk of detachment of the matrix from the reinforcing elements. This risk is countered by coating the polymeric reinforcing particles with a second polymer material which is more similar to the matrix material and is therefore able to form a stronger bond to the matrix (Young-Sam Kim, "Synthesis and Characterisation of Multiphase Polymeric Lattices Having a Core/Shell Morphology", dissertation, University of Karlsruhe (TH), Shaker Verlag, Aachen (1993), pages 2-22). In addition, it has also been recommended to graft the coating polymer onto the reinforcing polymer in order also to prevent detachment of the shell from the reinforcing particles by means of covalent bonds (W.-M. Billig-Peters, "Core/Shell Polymers with the Aid of Polymeric Azo Initiators", dissertation, University of Bayreuth (1991).

The specific production of core/shell polymers is generally carried out by stepwise emulsion polymerisation, in which firstly a latex of core particles is produced in the first step, and the shell polymer is produced in the second step, where the core particles act as "seed particles", onto the surface of which the shell polymers are preferably deposited.

Natural precious opals are built up from domains consisting of mono-disperse, closely packed and therefore regularly arranged silica gel spheres having diameters of 150-400 nm. The colour play of these opals is created by Bragg-like scattering of the incident light at the lattice planes of the domains arranged in a crystal-like manner.

There has been no lack of attempts to synthesise white and black opals for jewellery purposes using water-glass or silicone esters as starting material.

U.S. Pat. No. 4,703,020 describes a process for the production of a decorative material consisting of amorphous silica spheres which are arranged in a three-dimensional manner, with zirconium oxide or zirconium hydroxide being located in the interspaces between the spheres. The spheres have a diameter of 150-400 nm. The production is carried out in two steps. In a first step, silicon dioxide spheres are allowed to sediment from an aqueous suspension. The resultant material is then dried in air and subsequently calcined at 800° C. In a second step, the calcined material is introduced into the solution of a zirconium alkoxide, the alkoxide penetrating into the interspaces between the cores, and zirconium oxide being precipitated by hydrolysis. This material is subsequently calcined at 1000-1300° C.

A multiplicity of publications on the production of mono-disperse particles is known, for example EP-A-0 639 590 (production by precipitation polymerisation), A. Rudin, J. Polym. Sci., 33 (1995) 1849-1857 (mono-disperse particles having a core/shell structure) and EP-A-0 292 261 (production with addition of seed particles).

EP-A-0 441 559 describes core/shell polymers having different refractive indices of core and shell and their use as additives for paper-coating compositions.

EP-A-0 955 323 describes core/shell particles whose core and shell materials are able to form a two-phase system and which are characterised in that the shell material is filmable and the cores are essentially dimensionally stable under the conditions of film formation of the shell, are only swellable by the shell material to a very small extent, or not at all, and have a monodisperse size distribution, with a difference between the refractive indices of the core material and shell material of at least 0.001. The production of the core/shell particles and their use for the production of effect colorants are also described. The process for the production of an effect colorant comprises the following steps: application of the core/shell particles to a substrate of low adhesive capacity, if necessary evaporation or expulsion of any solvent or diluent present in the applied layer, transfer of the shell material of the core/shell particles into a liquid, soft or visco-elastic matrix phase, orientation of the cores of the core/shell particles at least to form domains having a regular structure, curing of the shell material in order to fix the regular core structure, detachment of the cured film from the substrate, and, if a pigment or powder is to be produced, comminution of the detached film to the desired particle size. In these core/shell particles disclosed in EP-A-0 955 323, the core "floats" in the shell matrix; a long-range order of the cores does not form in the melt, merely a close-range order of the cores in domains. These particles are thus of only restricted suitability for processing by the usual methods for polymers.

The earlier German patent application DE 10145450.3 discloses mouldings having an optical effect which essentially consist of core/shell particles whose shell forms a matrix and whose core is essentially solid and has an essentially monodisperse size distribution, where the shell is preferably permanently connected to the core via an interlayer. The refractive indices of the core material and shell material differ here, producing the said optical effect, preferably opalescence. According to the earlier German patent application DE 10204338.8, contrast materials, such as pigments, are additionally incorporated into mouldings made from core/shell particles of this type. The included contrast materials cause an increase in brightness, contrast and depth of the observed colour effects in these mouldings.

The mechanical properties of these mouldings are essentially determined by the shell polymers. The preferred shell polymers are elastomers. The mouldings of such preferred embodiments thus inevitably exhibit material properties of elastomers. For many applications, however, material properties as can only be offered by thermoplastics are, for example, necessary.

The object of the present invention was to avoid the above-mentioned disadvantages and to provide mouldings which simultaneously have a colour effect which is dependent on the viewing angle and mechanical properties which can be set as desired.

Surprisingly, it has now been found that this object can be achieved through the use of composite materials. The composite here is formed by at least one moulding which essentially consists of core/shell particles and determines the optical properties of the composite, and at least one further material which determines the mechanical properties of the composite.

A first subject-matter of the present invention is therefore a composite material having an optical effect, comprising at least one moulding which essentially consists of core/shell particles whose shell forms a matrix and whose core is essentially solid and has an essentially monodisperse size distribution, where a difference exists between the refractive indices of the core material and of the shell material, and at least one further material which determines the mechanical properties of the composite.

A further subject-matter of the present invention is a process for the production of composite materials having an optical effect, characterised in that at least one moulding which essentially consists of core/shell particles whose shell forms a matrix and whose core is essentially solid and has an essentially monodisperse size distribution, where a difference exists between the refractive indices of the core material and of the shell material, is strongly connected to at least one further material which determines the mechanical properties of the composite.

For the purposes of the invention, the term optical effect is taken to mean both effects in the visible wavelength region of light and also, for example, effects in the UV or infrared region. It has recently become customary to refer to effects of this type in general as photonic effects. All these effects are optical effects for the purposes of the present invention, where, in a preferred embodiment, the effect is opalescence in the visible region, i.e. a change in the observed colour impression as a function of the viewing angle. In the sense of a conventional definition of the term, the mouldings according to the invention are photonic crystals (cf. Nachrichten aus der Chemie; 49(9) September 2001; pp. 1018-1025).

It is particularly preferred in accordance with the invention for the shell in the core/shell particles to be connected to the core via an interlayer.

It is furthermore preferred for the core of the core/shell particles to consist of a material which is either not flowable or becomes flowable at a temperature above the melting point of the shell material. This can be achieved through the use of polymeric materials having a correspondingly high glass transition temperature ($T_g$), preferably crosslinked polymers, or through the use of inorganic core materials. The suitable materials are described below in detail.

The mouldings present in accordance with the invention in the composite material preferably correspond to the mouldings described in the earlier German patent application DE 10145450.3, the production and composition of which are described again below.

The moulding is preferably a film or layer which is preferably strongly connected to at least one further layer of another material which determines the mechanical properties of the composite. The term "layer" is basically chosen below for this embodiment, since a film in the composite material can in principle also be referred to as a layer.

In a preferred embodiment, composite materials of this type are in the form of two- or multilayered laminates.

Owing to the numerous established processing methods, the material which determines the mechanical properties of the composite is usually selected from the materials metal, glass, ceramic, wood or polymers (plastics), where polymers are preferably selected. Owing to their material properties, preferred polymers are in turn thermoplastics and rubber polymers. Examples of thermoplastic polymers are given below, particularly preferred rubber-like polymers in turn being 1,4-polyisoprene, polychloroprene, polybutadiene, styrene-butadiene rubber, nitrile rubber, butyl rubber, ethylene-propylene rubber having an ethylidenenorbornene content and polyoctenamer, where the selection of other thermoplastics or rubber polymers likewise causes the person skilled in the art no difficulties at all.

Besides the mechanical properties, the thermal, acoustic and electronic properties of the composite material can also be controlled in the composite through a suitable choice of materials.

If the mouldings made from core/shell particles form the outer material in the composite, the hapticity of the surface is, in particular, also an advantage in accordance with the invention. The hapticity can be described as "soft hand".

The composite materials according to the invention combine the advantages of mouldings essentially consisting of core/shell particles with easy processability and the superior mechanical properties of the material connected to the moulding. If the connected material is a rubber polymer, the composite exhibits high elasticity and tear strength of the rubber in combination with the viewing angle-dependent colour effect of the moulding. Composite materials of this type having rubber-like properties are suitable for the production of sensors for the detection of the action of mechanical force and sensors having an optical effect. The colour effect that can be observed is additionally dependent here on the state of elongation of the rubber-like support material.

If thermoplastics or thermoplastic elastomers are employed in the composite material, the composite material exhibits the mechanical hardness and scratch resistance of these polymers in addition to the above-mentioned colour effect. At the same time, the material can be processed using processing techniques developed for such thermoplastics. It is particularly advantageous in the case of this combination that the composite materials can be processed by thermoforming to give corresponding moulded parts which then exhibit the colour effect according to the invention.

In addition to control of the mechanical properties, the composites also enable a change in the optical properties of the mouldings via the additional refractive-index changes at the interfaces. In particular, surface structuring can additionally, as stated above, further reduce diffuse scattering and thus increase the brightness of the colour.

In a preferred embodiment of the present invention, at least one contrast material is included in the at least one moulding which essentially consists of core/shell particles, where the at least one contrast material is usually a pigment, preferably an absorption pigment and in a variant of the invention particularly preferably a black pigment.

The included contrast materials effect an increase in brightness, contrast and depth of the observed colour effects in the mouldings according to the invention. For the purposes of the invention, the term contrast materials is taken to mean all materials which effect such an enhancement of the optical effect. These contrast materials are usually pigments or organic dyes.

For the purposes of the present invention, the term pigments here is taken to mean any solid substance which exhibits an optical effect in the visible wavelength region of light. In accordance with the invention, the term pigments is applied here, in particular, to substances which conform to the definition of pigments in accordance with DIN 55943 or DIN 55945. According to this definition, a pigment is an inorganic or organic, coloured or non-coloured colorant which is virtually insoluble in the application medium. Both inorganic and organic pigments can be employed in accordance with the invention.

Naturally occurring inorganic pigments are obtained by mechanical treatment, such as grinding, elutriation, drying, etc. Examples thereof are chalk, ochre, umber, green earth, sienna (burnt) and graphite. Synthetic inorganic pigments are, in particular, white, black, coloured and lustre pigments, which can be isolated from inorganic raw materials by chemical and/or physical conversion, such as digestion, precipitation, ignition, etc. Examples are white pigments, such as titanium white (titanium dioxide), lead white, zinc white, lithopone and antimony white, black pigments, such as carbon black, iron oxide black, manganese black as well as cobalt black and antimony black, coloured pigments, such as lead chromate, minium, zinc yellow, zinc green, cadmium red, cobalt blue, Berlin blue, ultramarine, manganese violet, cadmium yellow, Schweinfurt green, molybdate orange and molybdate red, chromium orange and red, iron oxide red, chromium oxide green, strontium yellow and many others. Mention should also be made of lustre pigments having a metal effect and pearlescent pigments, vapour-deposition layers, luminescent pigments with fluorescent and phosphorescent pigments and the fillers or extenders. A distinction can thus be made in the case of inorganic pigments between the following groups: metal oxides, hydroxides and oxide hydrates; mixed phase pigments; sulfur-containing silicates; metal sulfides and selenides; complex metal cyanides; metal sulfates, chromates and molybdates; mixed pigments (inorganic/organic) and the metals themselves (bronze pigments).

Naturally occurring organic pigments are, for example, umber, gamboge, bone charcoal, Kassel brown, indigo, chlorophyll and other plant dyes. Synthetic organic pigments are, for example, azo dyes, indigoids, dioxazine (for example PV True Violet RL; Clariant), quinacridone, phthalocyanine (for example PV True Blue A2R; Clariant), isoindolinone, perylene and perinone, metal-complex, alkali blue and recently the diketopyrrolopyrrole (DPP) pigments, which have extreme light and weather fastness properties and are employed to a very great extent as clear, pure orange to red shades in paints. The variety of organic pigments will not be discussed in greater detail here, but the person skilled in the art is presented with no difficulties in selecting pigments suitable as contrast material from the commercially available pigments.

Pigments can be divided into absorption pigments and lustre pigments in accordance with their physical mode of functioning. Absorption pigments are pigments which absorb at least part of visible light and therefore cause a colour impression and in the extreme case appear black. According to DIN 55943 or DIN 55944, lustre pigments are pigments in which lustre effects arise through directed reflection at metallic or strongly light-refracting pigment particles which are formed and aligned in a predominantly two-dimensional manner. These standards define interference pigments as lustre pigments whose colouring action is based entirely or predominantly on the phenomenon of interference. In particular, these are so-called mother-of-pearl pigments or fire-coloured metal bronzes. Of economic importance amongst the interference pigments are also, in particular, the pearlescent pigments, which consist of colourless, transparent and highly light-refracting platelets. Depending on the orientation in a matrix, they produce a soft lustre effect which is known as pearlescence. Examples of pearlescent pigments are guanine-containing pearl essence, pigments based on lead carbonates, bismuth oxide chloride or titanium dioxide mica. In particular, the titanium dioxide micas, which are distinguished by mechanical, chemical and thermal stability, are frequently employed for decorative purposes.

In accordance with the invention, it is possible to employ both absorption and lustre pigments, it also being possible, in particular, to employ interference pigments. It has been found that the use of absorption pigments is preferred, in particular for increasing the intensity of the optical effects. Both white and coloured or black pigments can be employed here, where the term coloured pigments is intended to mean all pigments which give a colour impression other than white or black, such as, for example, Heliogen™ Blue K 6850 (BASF, Cu phthalocyanine pigment), Heliogen™ Green K 8730 (BASF, Cu phthalocyanine pigment), Bayferrox™ 105 M (Bayer, iron oxide-based red pigment) or Chromium Oxide Green GN-M (Bayer, chromium oxide-based green pigment). Owing to the colour effects achieved, preference is in turn given amongst the absorption pigments to black pigments. For example, mention may be made here of pigment carbon black (for example the carbon black product line from Degussa (in particular Purex™ LS 35 and Corax™ N 115)) and iron oxide black, manganese black as well as cobalt black and antimony black. Black mica grades can also advantageously be employed as black pigment (for example Iriodin™ 600, Merck; iron oxide-coated mica).

It has been found that it is advantageous if the particle size of the at least one contrast material is at least twice as large as the particle size of the core material. If the particles of the contrast material are smaller, only inadequate optical effects are achieved. It is assumed that smaller particles interfere with the arrangement of the cores in the matrix and cause a change in the lattice which forms. The particles preferably employed in accordance with the invention, which have a size which is at least twice that of the cores, only interact locally with the lattice formed from the cores. Electron photomicrographs (see also Example 3) confirm that the incorporated particles only interfere with the lattice of core particles to a small extent, or not at all. The term particle size of the contrast materials, which are frequently also platelet-shaped as pigments, is in each case taken to mean here the largest dimension of the particles. If platelet-shaped pigments have a thickness in the region of the particle size of the cores or even below, the present studies show that this does not interfere with the lattice orders. It has also been found that the shape of the incorporated contrast material particles has little or no influence on the optical effect. Both spherical and platelet-shaped and needle-shaped contrast materials can be incorporated in accordance with the invention. The only factor of significance appears to be the absolute particle size in relation to the particle size of the cores. It is therefore preferred for the purposes of the invention if the particle size of the at least one contrast material is at least twice as large as the particle size of the core material, where the particle size of the at least one contrast material is preferably at least four times as large as the particle size of the core material, since the observable interactions are then even smaller.

A sensible upper limit for the particle size of the contrast materials arises from the limit at which the individual particles themselves become visible or impair the mechanical properties of the moulding owing to their particle size. Determination of this upper limits causes the person skilled in the art. no difficulties at all Also of importance for the desired effect is the amount of contrast material employed. It has been found that effects are usually observed if at least 0.05% by weight of contrast material, based on the weight of the moulding, are employed. It is particularly preferred for the moulding to comprise at least 0.2% by weight and especially preferably at least 1% by weight of contrast material since these increased contents of contrast material generally also result, in accordance with the invention, in more intense effects.

Conversely, relatively large amounts of contrast material under certain circumstances adversely affect the processing properties of the core/shell particles and thus make the production of mouldings according to the invention more difficult. In addition, it is expected that the formation of the lattice of core particles will be interfered with above a certain proportion of contrast material, which is dependent on the particular material, and instead oriented contrast material layers will form. It is therefore preferred in accordance with the invention for the moulding to comprise a maximum of 20% by weight of contrast material, based on the weight of the moulding, it being particularly preferred for the moulding to comprise a maximum of 12% by weight and especially preferably a maximum of 5% by weight of contrast material.

In a particular embodiment of the present invention, however, it may also be preferred for the mouldings to comprise the largest possible amounts of contrast material. This is the case, in particular, if the contrast material is at the same time intended to increase the mechanical strength of the moulding.

Mouldings which comprise a contrast material preferably correspond here to the mouldings described in the earlier German patent application DE 10204338.8.

Irrespective of whether the mouldings comprise a contrast material, they are preferably produced by a process for the production of mouldings having an optical effect which is characterised in that a) core/shell particles whose shell forms a matrix and whose core is essentially solid and has an essentially monodisperse size distribution, where a difference exists between the refractive indices of the core material and shell material, are heated to a temperature at which the shell is flowable, and b) the flowable core/shell particles from a) are subjected to a mechanical force.

If the mouldings are to comprise the contrast material described above, the core/shell particles are mixed with the contrast material before they are subjected to the mechanical force from a).

In a preferred variant of the production, the temperature in step a) is at least 40° C., preferably at least 60° C., above the glass transition temperature of the shell of the core/shell particles. It has been found empirically that the flowability of the shell in this temperature range meets the requirements for economical production of the mouldings to a particular extent.

In a likewise preferred process variant which results in suitable mouldings, the flowable core/shell particles are cooled, under the action of the mechanical force from b), to a temperature at which the shell is no longer flowable.

The action of mechanical force can be the action of a force which occurs in the conventional processing steps of polymers. In preferred variants of the present invention, the action of mechanical force takes place either:
  through uniaxial pressing or
  action of force during an injection-moulding operation or
  during a transfer moulding operation,
  during (co)extrusion or
  during a calendering operation or
  during a blowing operation.

If the action of force takes place through uniaxial pressing, the mouldings according to the invention are preferably films or layers. Films or layers according to the invention can preferably also be produced by rolling, calendering, film blowing or flat-film extrusion. The various ways of processing polymers under the action of mechanical forces are well known to the person skilled in the art and are revealed, for example, by the standard textbook Adolf Franck, "Kunststoff-Kompendium" [Plastics Compendium]; Vogel-Verlag; 1996.

Extrusion is suitable for the production of pipes, wires, profiles, hoses, etc. Extrusion is carried out in extruders, which are usually designed as screw extruders, more rarely as ram extruders. They are charged with core/shell particles in the form of powders or granules through fill hoppers. The material is warmed or cooled, homogenised, plasticated, transported by the (frequently stepped) screw and forced through the shaping die in the extruder head.

Extruders exist in various variants; thus, a distinction is made, for example, depending on the number of transport screws, between single- and multiscrew extruders, machines with electronic control or guidance by ultrasound. Extruders can also advantageously be employed for the plastication of materials which are difficult to process. All the extruders described here are suitable for the processing of corresponding core/shell particles.

During extrusion, pre-warmed material is conveyed out of the extruder through a perforated plate by a screw or twin screw and allowed to cool in air or in a cooling bath. In this way, pipes, profiles, plates, sheets, cables or filaments can be produced from core/shell particles; many spinning processes are also extrusion processes. The dimensional stability required can be achieved through the use of polymers of high molecular weight, i.e. those with entanglement of chain molecules. Alternatively, polymers can also be slightly crosslinked.

A special case is extrusion using flat-film dies to give, for example, flat films having a thickness of 20-1000 mm. The film can subsequently be quenched by means of chill rolls or water baths (melt casting or chill-roll process). However, the film production can also be carried out by extrusion blow moulding using ring dies. Flat-film dies are also used in the so-called extrusion coating of paper or board. The papers treated in this way can then be heat-sealed. Extrusion is also used for cladding cables and fibres.

In the extrusion of core/shell particles with a polyethyl acrylate or polyethyl acrylate copolymer shell, it has proven ideal for the ram or screw temperature and the die temperature to be not significantly above 220° C. For optimum results, however, these temperatures should also not be significantly below 120° C.

In a preferred variant of the process, a structured surface is simultaneously produced during the action of mechanical force. This is achieved by the tools used already having a surface structuring of this type. For example, injection moulding can be carried out using corresponding moulds whose surface produces this structuring or uniaxial pressing can also be carried out using compression moulds in which at least one of the compression moulds has a surface structuring. For example, imitation leather which has a leather-like surface structure and at the same time exhibits the colour effects discussed above can be produced using these methods.

The mouldings may, if technically advantageous, comprise auxiliaries and additives here. They can serve for optimum setting of the applicational data or properties desired or necessary for application and processing. Examples of auxiliaries and/or additives of this type are antioxidants, UV stabilisers, biocides, plasticisers, film-formation auxiliaries, flow-control agents, fillers, melting assistants, adhesives, release agents, application auxiliaries, mould release agents and viscosity modifiers, for example thickeners or flow improvers.

Particularly recommended are additions of film-formation auxiliaries and film modifiers based on compounds of the general formula HO—$C_nH_{2n}$—O—$(C_nH_{2n}$—O$)_m$H, in which n is a number from 2 to 4, preferably 2 or 3, and m is a number from 0 to 500. The number n can vary within the chain, and the various chain members can be incorporated in a random or blockwise distribution. Examples of auxiliaries of this type are ethylene glycol, propylene glycol, di-, tri- and tetraethylene glycol, di-, tri- and tetrapropylene glycol, polyethylene oxides, polypropylene oxide and ethylene oxide-propylene oxide copolymers having molecular weights of up to about 15,000 and a random or block-like distribution of the ethylene oxide and propylene oxide units.

If desired, organic or inorganic solvents, dispersion media or diluents, which, for example, extend the open time of the formulation, i.e. the time available for its application to substrates, waxes or hot-melt adhesives are also possible as additives.

If desired, UV and weathering stabilisers can also be added to the mouldings. Suitable for this purpose are, for example, derivatives of 2,4-dihydroxybenzophenone, derivatives of 2-cyano-3,3'-diphenyl acrylate, derivatives of 2,2',4,4'-tetrahydroxybenzophenone, derivatives of o-hydroxyphenylbenzotriazole, salicylic acid esters, o-hydroxyphenyl-s-triazines or sterically hindered amines. These substances may likewise be employed individually or in the form of a mixture.

In the case of processing by injection moulding, it may be particularly preferred for chalk or other finely particulate release agents, such as, for example, silica or waxes, to be added to the core/shell particles as assistants for reducing the tack.

The total amount of auxiliaries and/or additives is up to 40% by weight, preferably up to 20% by weight, particularly preferably up to 5% by weight, of the weight of the mouldings. Accordingly, the mouldings consist of at least 60% by weight, preferably at least 80% by weight and particularly preferably at least 95% by weight, of core/shell particles.

In order to achieve the desired optical or photonic effect, it is desirable for the core/shell particles to have a mean particle diameter in the range from about 5 nm to about 2000 nm. It may be particularly preferred here for the core/shell particles to have a mean particle diameter in the range from about 5 to 20 nm, preferably from 5 to 10 nm. In this case, the cores may be known as "quantum dots"; they exhibit the corresponding effects known from the literature. In order to achieve colour effects in the region of visible light, it is particularly advantageous for the core/shell particles to have a mean particle diameter in the region of about 50-500 nm. Particular preference is given to the use of particles in the range 100-500 nm since in particles in this size range (depending on the refractive index contrast achievable in the photonic structure), the reflections of various wavelengths of visible light differ significantly from one another, and thus the opalescence which is particularly important for optical effects in the visible region occurs to a particularly pronounced extent in a very wide variety of colours. However, it is also preferred in a variant of the present invention to employ multiples of this preferred particle size, which then result in reflections corresponding to the higher orders and thus in a broad colour play.

A further crucial factor for the intensity of the observed effects is the difference between the refractive indices of core and shell. Mouldings according to the invention preferably have a difference between the refractive indices of the core material and shell material of at least 0.001, preferably at least 0.01 and particularly preferably at least 0.1.

In a particular embodiment of the invention, further nanoparticles are included in the matrix phase of the mouldings in addition to the cores of the core/shell particles. These particles are selected with respect to their particle size in such a way that they fit into the cavities of the sphere packing of the cores and thus cause only little change in the arrangement of the cores. Through specific selection of corresponding materials and/or the particle size, it is firstly possible to modify the optical effects of the mouldings, for example to increase their intensity. Secondly, it is possible through incorporation of suitable "quantum dots", to functionalise the matrix correspondingly. Preferred materials are inorganic nanoparticles, in particular nanoparticles of metals or of II-VI or III-V semiconductors or of materials which influence the magnetic/electrical (electronic) properties of the materials. Examples of preferred nanoparticles are noble metals, such as silver, gold and platinum, semiconductors or insulators, such as zinc and calcium chalcogenides, oxides, such as haematite, magnetite or perovskite, or metal pnictides, for example gallium nitride, or mixed phases of these materials.

The precise mechanism which results in the uniform orientation of the core/shell particles in the mouldings which are suitable in accordance with the invention was hitherto unknown. However, it has been found that the action of force is essential for the formation of the far-reaching order. It is assumed that the elasticity of the shell material under the processing conditions is crucial for the ordering process. The chain ends of the shell polymers generally attempt to adopt a coiled shape. If two particles come too close, the coils are compressed in accordance with the model concept, and repellent forces arise. Since the shell-polymer chains of different particles also interact with one another, the polymer chains are stretched in accordance with the model if two particles move away from one another. Due to the attempts by the shell-polymer chains to re-adopt a coiled shape, a force arises which pulls the particles closer together again. In accordance with the model concept, the far-reaching order of the particles in the moulding is caused by the interaction of these forces.

Particularly suitable core/shell particles for the production of the mouldings have proven to be those whose shell is bonded to the core via an interlayer.

In a preferred embodiment of the invention, the interlayer is a layer of crosslinked or at least partially crosslinked polymers. The crosslinking of the interlayer here can take place via free radicals, for example induced by UV irradiation, or preferably via di- or oligofunctional monomers. Preferred interlayers in this embodiment comprise from 0.01 to 100% by weight, particularly preferably from 0.25 to 10% by weight, of di- or oligofunctional monomers. Preferred di- or oligofunctional monomers are, in particular, isoprene and allyl methacrylate (ALMA). Such an interlayer of crosslinked or at least partially crosslinked polymers preferably has a thickness in the range from 10 to 20 nm. If the interlayer comes out thicker, the refractive index of the layer is selected so that it corresponds either to the refractive index of the core or to the refractive index of the shell.

If copolymers which, as described above, contain a crosslinkable monomer are employed as interlayer, the person skilled in the art will have absolutely no problems in suitably selecting corresponding copolymerisable monomers. For example, corresponding copolymerisable monomers can be selected from a so-called Q-e-scheme (cf. textbooks on macromolecular chemistry). Thus, monomers such as methyl methacrylate and methyl acrylate can preferably be polymerised with ALMA.

In another, likewise preferred embodiment of the present invention, the shell polymers are grafted directly onto the core via a corresponding functionalisation of the core. The surface functionalisation of the core here forms the interlayer according to the invention. The type of surface functionalisation here depends principally on the material of the core. Silicon dioxide surfaces can, for example, be suitably modified with silanes carrying correspondingly reactive end groups, such as epoxy functions or free double bonds. Other surface functionalisations, for example for metal oxides, can be titanates or organoaluminium compounds, each containing organic side chains with corresponding functions. In the case of polymeric cores, the surface modification can be carried out, for example, using a styrene which is functionalised on the aromatic ring, such as bromostyrene. This functionalisation then allows growing-on of the shell polymers to be achieved. In particular, the interlayer can also effect adhesion of the shell to the core via ionic interactions or complex bonds.

In a preferred embodiment, the shell of these core/shell particles essentially consists of uncrosslinked organic polymers, which are preferably grafted onto the core via an at least partially crosslinked interlayer.

The shell here can consist either of thermoplastic or elastomeric polymers. Since the shell essentially determines the material properties and processing conditions of the core/shell particles, the person skilled in the art will select the shell material in accordance with the usual considerations in polymer technology. In particular if movements or stresses in a material are to result in optical effects, the use of elastomers as shell material is preferred. In mouldings according to the invention, the separations between the cores are changed by such movements. The wavelengths of the interacting light and the effects to be observed change correspondingly.

The core can consist of a very wide variety of materials. The essential factor according to the invention is, as already stated, that a refractive-index difference to the shell exists and the core remains solid under the processing conditions.

It is furthermore particularly preferred in a variant of the invention for the core to consist of an organic polymer, which is preferably crosslinked.

In another, likewise preferred variant of the invention, the core consists of an inorganic material, preferably a metal or semimetal or a metal chalcogenide or metal pnictide. For the purposes of the present invention, chalcogenides are taken to mean compounds in which an element from group 16 of the Periodic Table of the Elements is the electronegative bonding partner; pnictides are taken to mean those in which an element from group 15 of the Periodic Table of the Elements is the electronegative bonding partner.

Preferred cores consist of metal chalcogenides, preferably metal oxides, or metal pnictides, preferably nitrides or phosphides. Metals in the sense of these terms are all elements which can occur as electropositive partner compared with the counterions, such as the classical metals of the sub-groups, or the main-group metals from the first and second main groups, but also all elements from the third main group, as well as silicon, germanium, tin, lead, phosphorus, arsenic, antimony and bismuth. The preferred metal chalcogenides and metal pnictides include, in particular, silicon dioxide, aluminium oxide, gallium nitride, boron nitride, aluminium nitride, silicon nitride and phosphorus nitride.

The starting materials employed for the production of the core/shell particles according to the invention in a variant of the present invention are preferably monodisperse cores of silicon dioxide, which can be obtained, for example, by the process described in U.S. Pat. No. 4,911,903. The cores here are produced by hydrolytic polycondensation of tetraalkoxysilanes in an aqueous-ammoniacal medium, where firstly a sol of primary particles is produced, and the resultant $SiO_2$ particles are subsequently converted into the desired particle size by continuous, controlled metered addition of tetraalkoxysilane. This process enables the production of monodisperse $SiO_2$ cores having mean particle diameters of between 0.05 and 10 µm with a standard deviation of 5%.

Also preferred as starting material are $SiO_2$ cores which have been coated with (semi)metals or metal oxides which do not absorb in the visible region, such as, for example, $TiO_2$, $ZrO_2$, $ZnO_2$, $SnO_2$ or $Al_2O_3$. The production of $SiO_2$ cores coated with metal oxides is described in greater detail in, for example, U.S. Pat. No. 5,846,310, DE 198 42 134 and DE 199 29 109.

The starting material employed can also be monodisperse cores of non-absorbent metal oxides, such as $TiO_2$, $ZrO_2$, $ZnO_2$, $SnO_2$ or $Al_2O_3$, or metal-oxide mixtures. Their production is described, for example, in EP 0 644 914. Furthermore, the process of EP 0 216 278 for the production of monodisperse $SiO_2$ cores can readily be applied to other oxides with the same result. Tetraethoxysilane, tetrabutoxytitanium, tetrapropoxyzirconium or mixtures thereof are added in one portion, with vigorous mixing, to a mixture of alcohol, water and ammonia, whose temperature is set precisely to from 30 to 40° C. using a thermostat, and the resultant mixture is stirred vigorously for a further 20 seconds, giving a suspension of monodisperse cores in the nanometre region. After a post-reaction time of from 1 to 2 hours, the cores are separated off in a conventional manner, for example by centrifugation, washed and dried.

Suitable starting materials for the production of the core/shell particles according to the invention are furthermore also monodisperse cores of polymers which contain included particles, for example metal oxides. Materials of this type are available, for example, from micro caps Entwicklungs- und Vertriebs GmbH in Rostock. Microencapsulations based on polyesters, polyamides and natural and modified carbohydrates are produced in accordance with customer-specific requirements.

It is furthermore possible to employ monodisperse cores of metal oxides which have been coated with organic materials, for example silanes. The monodisperse cores are dispersed in alcohols and modified with conventional organoalkoxysilanes. The silanisation of spherical oxide particles is also described in DE 43 16 814. The silanes here preferably form the above-mentioned interlayer.

For the intended use of the core/shell particles according to the invention for the production of mouldings, it is important that the shell material is filmable, i.e. that it can be softened, visco-elastically plasticised or liquefied by simple measures to such an extent that the cores of the core/shell particles are at least able to form domains having a regular arrangement. The regularly arranged cores in the matrix formed by film formation of the shell of the core/shell particles form a diffraction grating, which causes interference phenomena and thus results in very interesting colour effects.

The materials of core and shell may, as long as they satisfy the conditions indicated above, be of an inorganic, organic or even metallic character or they may be hybrid materials.

In view of the possibility of varying the invention-relevant properties of the cores of the core/shell particles according to the invention as needed, however, it is often advantageous for the cores to comprise one or more polymers and/or copolymers (core polymers) or to consist of polymers of this type.

The cores preferably comprise a single polymer or copolymer. For the same reason, it is advantageous for the shell of the core/shell particles according to the invention likewise to comprise one or more polymers and/or copolymers (shell polymers; matrix polymers) or polymer precursors and, if desired, auxiliaries and additives, where the composition of the shell may be selected in such a way that it is essentially dimensionally stable and tack-free in a non-swelling environment at room temperature.

With the use of polymer substances as shell material and, if desired, core material, the person skilled in the art gains the freedom to determine their relevant properties, such as, for example, their composition, the particle size, the mechanical data, the refractive index, the glass transition temperature, the melting point and the core:shell weight ratio and thus also the applicational properties of the core/shell particles, which ultimately also affect the properties of the mouldings produced therefrom.

Polymers and/or copolymers which may be present in the core material or of which it consists are high-molecular-weight compounds which conform to the specification given above for the core material. Both polymers and copolymers of polymerisable unsaturated monomers and polycondensates and copolycondensates of monomers containing at least two reactive groups, such as, for example, high-molecular-weight aliphatic, aliphatic/aromatic or fully aromatic polyesters, polyamides, polycarbonates, polyureas and polyurethanes, but also amino and phenolic resins, such as, for example, melamine-formaldehyde, urea-formaldehyde and phenol-formaldehyde condensates, are suitable.

For the production of epoxy resins, which are likewise suitable as core material, epoxide prepolymers, which are obtained, for example, by reaction of bisphenol A or other bisphenols, resorcinol, hydroquinone, hexanediol or other aromatic or aliphatic diols or polyols, or phenol-formaldehyde condensates, or mixtures thereof with one another, with epichlorohydrin or other di- or polyepoxides, are usually mixed with further condensation-capable compounds directly or in solution and allowed to cure.

The polymers of the core material are advantageously, in a preferred variant of the invention, crosslinked (co)polymers, since these usually only exhibit their glass transition at high temperatures. These crosslinked polymers may either already have been crosslinked during the polymerisation or polycondensation or copolymerisation or copoly-condensation or may have been post-crosslinked in a separate process step after the actual (co)polymerisation or (co)polycondensation.

A detailed description of the chemical composition of suitable polymers follows below.

In principle, polymers of the classes already mentioned above, if they are selected or constructed in such a way that they conform to the specification given above for the shell polymers, are suitable for the shell material and for the core material.

For certain applications, such as, for example, for the production of coatings or coloured films, it is favourable, as already stated above, for the polymer material of the matrix phase-forming shell of the core/shell particles according to the invention to be an elastically deformable polymer, for example a polymer having a low glass transition temperature. In this case, it is possible to achieve a situation in which the colour of the moulding according to the invention varies on elongation and compression. Also of interest for the application are core/shell particles according to the invention which, on film formation, result in mouldings which exhibit dichroism.

Polymers which meet the specifications for a shell material are likewise present in the groups of polymers and copolymers of polymerisable unsaturated monomers and polycondensates and copolycondensates of monomers containing at least two reactive groups, such as, for example, high-molecular-weight aliphatic, aliphatic/aromatic or fully aromatic polyesters and polyamides.

Taking into account the above conditions for the properties of the shell polymers (=matrix polymers), selected units from all groups of organic film formers are in principle suitable for their production.

Some further examples are intended to illustrate the broad range of polymers which are suitable for the production of the shells.

If the shell is intended to have a comparatively low refractive index, polymers such as polyethylene, polypropylene, polyethylene oxide, polyacrylates, polymethacrylates, polybutadiene, polymethyl methacrylate, polytetrafluoroethylene, polyoxymethylene, polyesters, polyamides, polyepoxides, polyurethane, rubber, polyacrylonitrile and polyisoprene, for example, are suitable.

If the shell is intended to have a comparatively high refractive index, polymers having a preferably aromatic basic structure, such as polystyrene, polystyrene copolymers, such as, for example, SAN, aromatic-aliphatic polyesters and polyamides, aromatic polysulfones and polyketones, polyvinyl chloride, polyvinylidene chloride and, on suitable selection of a high-refractive-index core material, also polyacrylonitrile or polyurethane, for example, are suitable for the shell.

In an embodiment of core/shell particles which is particularly preferred in accordance with the invention, the core consists of crosslinked polystyrene and the shell of a polyacrylate, preferably polyethyl acrylate, polybutyl acrylate, polymethyl methacrylate and/or a copolymer thereof.

With respect to particle size, particle-size distribution and refractive-index differences, the above-stated regarding the mouldings applies analogously to the core/shell particles according to the invention.

With respect to the processability of the core/shell particles into mouldings, it is advantageous for the core:shell weight ratio to be in the range from 2:1 to 1:5, preferably in the range from 3:2 to 1:3 and particularly preferably in the region below 1.2:1. In specific embodiments of the present invention, it is even preferred for the core:shell weight ratio to be less than 1:1, a typical upper limit for the shell content being at a core:shell weight ratio of 2:3.

The core/shell particles according to the invention can be produced by various processes. A preferred way of obtaining the particles is a further subject-matter of the present invention. This is a process for the production of core/shell particles by a) surface treatment of monodisperse cores, and b) application of the shell of organic polymers to the treated cores.

In a process variant, the monodisperse cores are obtained in step a) by emulsion polymerisation.

In a preferred variant of the invention, a crosslinked polymeric interlayer, which preferably contains reactive centres to which the shell can be covalently bonded, is applied to the cores in step a), preferably by emulsion polymerisation or by ATR polymerisation. ATR polymerisation here stands for atom transfer radical polymerisation, as described, for example, in K. Matjaszewski, Practical Atom Transfer Radical Polymerisation, Polym. Mater. Sci. Eng. 2001, 84. The encapsulation of inorganic materials by means of ATRP is described, for example, in T. Werne, T. E. Patten, Atom Transfer Radical Polymerisation from Nanoparticles: A Tool for the Preparation of Well-Defined Hybrid Nanostructures and for Understanding the Chemistry of Controlled/"Living" Radical Polymerisation from Surfaces, J. Am. Chem. Soc. 2001, 123, 7497-7505 and WO 00/11043. The performance both of this method and of emulsion polymerisations is familiar to the person skilled in the art of polymer preparation and is described, for example, in the above-mentioned literature references.

The liquid reaction medium in which the polymerisations or copolymerisations can be carried out consists of the solvents, dispersion media or diluents usually employed in polymerisations, in particular in emulsion polymerisation processes. The choice here is made in such a way that the emulsifiers employed for homogenisation of the core particles and shell precursors are able to develop adequate efficacy. Suitable liquid reaction media for carrying out the process according to the invention are aqueous media, in particular water.

Suitable for initiation of the polymerisation are, for example, polymerisation initiators which decompose either thermally or photochemically, form free radicals and thus initiate the polymerisation. Preferred thermally activatable polymerisation initiators here are those which decompose at between 20 and 180° C., in particular at between 20 and 80° C. Particularly preferred polymerisation initiators are peroxides, such as dibenzoyl peroxide, di-tert-butyl peroxide, peresters, percarbonates, perketals, hydroperoxides, but also inorganic peroxides, such as $H_2O_2$, salts of peroxosulfuric acid and peroxodisulfuric acid, azo compounds, alkylboron compounds, and hydrocarbons which decompose homolytically. The initiators and/or photoinitiators, which, depending on the requirements of the polymerised material, are employed in amounts of between 0.01 and 15% by weight, based on the polymerisable components, can be used individually or, in order to utilise advantageous synergistic effects, in combination with one another. In addition, use is made of redox systems, such as, for example, salts of peroxodisulfuric acid and peroxosulfuric acid in combination with low-valency sulfur compounds, particularly ammonium peroxodisulfate in combination with sodium dithionite.

Corresponding processes have also been described for the production of polycondensation products. Thus, it is possible for the starting materials for the production of polycondensation products to be dispersed in inert liquids and condensed, preferably with removal of low-molecular-weight reaction products, such as water or—for example on use of di(lower alkyl) dicarboxylates for the preparation of polyesters or polyamides—lower alkanols.

Polyaddition products are obtained analogously by reaction of compounds which contain at least two, preferably three, reactive groups, such as, for example, epoxide, cyanate, isocyanate or isothiocyanate groups, with compounds carrying complementary reactive groups. Thus, isocyanates react, for example, with alcohols to give urethanes, with amines to give urea derivatives, while epoxides react with these complementary groups to give hydroxyethers or hydroxyamines. Like the polycondensations, polyaddition reactions can also advantageously be carried out in an inert solvent or dispersion medium.

It is also possible for aromatic, aliphatic or mixed aromatic/aliphatic polymers, for example polyesters, polyurethanes, polyamides, polyureas, polyepoxides or also solution polymers, to be dispersed or emulsified (secondary dispersion) in a dispersion medium, such as, for example, in water, alcohols, tetrahydrofuran or hydrocarbons, and to be post-condensed, crosslinked and cured in this fine distribution.

The stable dispersions required for these polymerisation, polycondensation or polyaddition processes are generally produced using dispersion auxiliaries.

The dispersion auxiliaries used are preferably water-soluble, high-molecular-weight organic compounds having polar groups, such as polyvinylpyrrolidone, copolymers of vinyl propionate or acetate and vinylpyrrolidone, partially saponified copolymers of an acrylate and acrylonitrile, polyvinyl alcohols having different residual acetate contents, cellulose ethers, gelatine, block copolymers, modified starch, low-molecular-weight polymers containing carboxyl and/or sulfonyl groups, or mixtures of these substances.

Particularly preferred protective colloids are polyvinyl alcohols having a residual acetate content of less than 35 mol %, in particular from 5 to 39 mol %, and/or vinylpyrrolidone-vinyl propionate copolymers having a vinyl ester content of less than 35% by weight, in particular from 5 to 30% by weight.

It is possible to use nonionic or ionic emulsifiers, if desired also as a mixture. Preferred emulsifiers are optionally ethoxylated or propoxylated, relatively long-chain alkanols or alkylphenols having different degrees of ethoxylation or propoxylation (for example adducts with from 0 to 50 mol of alkylene oxide) or neutralised, sulfated, sulfonated or phosphated derivatives thereof. Neutralised dialkylsulfosuccinic acid esters or alkyldiphenyl oxide disulfonates are also particularly suitable.

Particularly advantageous are combinations of these emulsifiers with the above-mentioned protective colloids, since particularly finely divided dispersions are obtained therewith.

Special processes for the production of monodisperse polymer particles have also already been described in the literature (for example R. C. Backus, R. C. Williams, J. Appl. Physics 19, p. 1186 (1948)) and can advantageously be employed, in particular, for the production of the cores. It need merely be ensured here that the above-mentioned particle sizes are observed. A further aim is the greatest possible uniformity of the polymers. The particle size in particular can be set via the choice of suitable emulsifiers and/or protective colloids or corresponding amounts of these compounds.

Through the setting of the reaction conditions, such as temperature, pressure, reaction duration and use of suitable catalyst systems, which influence the degree of polymerisation in a known manner, and the choice of the monomers employed for their production—in terms of type and proportion—the desired property combinations of the requisite polymers can be set specifically. The particle size here can be set, for example, through the choice and amount of the initiators and other parameters, such as the reaction temperature. The corresponding setting of these parameters does not present any difficulties at all to the person skilled in the art in the area of polymerisation.

Monomers which result in polymers having a high refractive index are generally those which contain aromatic moieties or those which contain heteroatoms having a high atomic number, such as, for example, those halogen atoms, in particular bromine or iodine atoms, sulfur or metal ions, i.e. atoms or atomic groups which increase the polarisability of the polymers.

Polymers having a low refractive index are accordingly obtained from monomers or monomer mixtures which do not contain the said moieties and/or atoms of high atomic number or only do so in a small proportion.

A review of the refractive indices of various common homopolymers is given, for example, in Ullmanns Encyklopädie der technischen Chemie [Ullmann's Encyclopaedia of Industrial Chemistry], 5th Edition, Volume A21, page 169. Examples of monomers which can be polymerised by means of free radicals and result in polymers having a high refractive index are:

Group a): styrene, styrenes which are alkyl-substituted on the phenyl ring, α-methylstyrene, mono- and dichlorostyrene, vinylnaphthalene, isopropenylnaphthalene, isopropenylbiphenyl, vinylpyridine, isopropenylpyridine, vinylcarbazole, vinylanthracene, N-benzylmethacrylamide and p-hydroxymethacrylanilide.

Group b): acrylates containing aromatic side chains, such as, for example, phenyl (meth)acrylate (=abbreviated notation for the two compounds phenyl acrylate and phenyl methacrylate), phenyl vinyl ether, benzyl (meth)acrylate, benzyl vinyl ether, and compounds of the formulae:

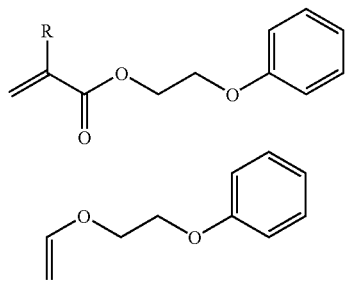

In order to improve clarity and simplify the notation of carbon chains in the formulae above and below, only the bonds between the carbon atoms are shown. This notation corresponds to the depiction of aromatic cyclic compounds, where, for example, benzene is depicted by a hexagon with alternating single and double bonds.

Also suitable are compounds containing sulfur bridges instead of oxygen bridges, such as, for example:

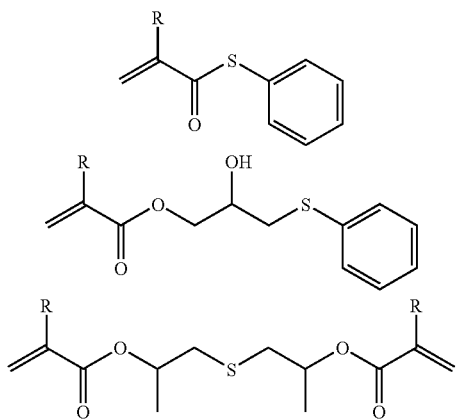

-continued

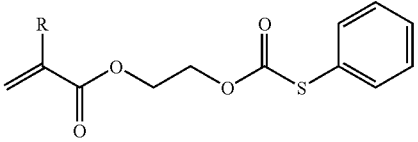

In the above formulae, R is hydrogen or methyl. The phenyl rings in these monomers may carry further substituents. Such substituents are suitable for modifying the properties of the polymers produced from these monomers within certain limits. They can therefore be used in a targeted manner to optimise, in particular, the applicationally relevant properties of the mouldings according to the invention.

Suitable substituents are, in particular, halogen, $NO_2$, alkyl groups having from one to twenty carbon atoms, preferably methyl, alkoxides having from one to twenty carbon atoms, carboxyalkyl groups having from one to twenty carbon atoms, carbonylalkyl groups having from one to twenty carbon atoms or —OCOO-alkyl groups having from one to twenty carbon atoms. The alkyl chains in these radicals may themselves optionally be substituted or interrupted by divalent heteroatoms or groups, such as, for example, —O—, —S—, —NH—, —COO—, —OCO— or —OCOO—, in non-adjacent positions.

Group c): monomers containing heteroatoms, such as, for example, vinyl chloride, acrylonitrile, methacrylonitrile, acrylic acid, methacrylic acid, acrylamide and methacrylamide, or organometallic compounds, such as, for example,

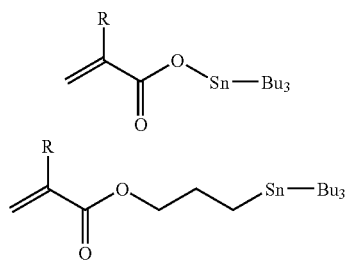

Group d): an increase in the refractive index of the polymers is also achieved by copolymerisation of carboxyl-containing monomers and conversion of the resultant "acidic" polymers into the corresponding salts with metals of relatively high atomic weight, such as, for example, preferably with K, Ca, Sr, Ba, Zn, Pb, Fe, Ni, Co, Cr, Cu, Mn, Sn or Cd.

The above-mentioned monomers, which make a considerable contribution towards the refractive index of the polymers produced therefrom, can be homopolymerised or copolymerised with one another. They can also be copolymerised with a certain proportion of monomers which make a lesser contribution towards the refractive index. Such copolymerisable monomers having a lower refractive index contribution are, for example, acrylates, methacrylates, vinyl ethers or vinyl esters containing purely aliphatic radicals.

In addition, crosslinking agents which can be employed for the production of crosslinked polymer cores from polymers produced by means of free radicals are also all bifunctional or polyfunctional compounds which are copolymerisable with the above-mentioned monomers or which can subsequently react with the polymers with crosslinking.

Examples of suitable crosslinking agents are presented below, divided into groups for systematisation:

Group 1: bisacrylates, bismethacrylates and bisvinyl ethers of aromatic or aliphatic di- or polyhydroxyl compounds, in particular of butanediol (butanediol di(meth)acrylate, butanediol bisvinyl ether), hexanediol (hexanediol di(meth)acrylate, hexanediol bisvinyl ether), pentaerythritol, hydroquinone, bishydroxyphenylmethane, bishydroxyphenyl ether, bis-hydroxymethylbenzene, bisphenol A or with ethylene oxide spacers, propylene oxide spacers or mixed ethylene oxide/propylene oxide spacers.

Further crosslinking agents from this group are, for example, di- or polyvinyl compounds, such as divinylbenzene, or methylenebisacrylamide, triallyl cyanurate, divinylethyleneurea, trimethylolpropane tri(meth)acrylate, trimethylolpropane trivinyl ether, pentaerythritol tetra(meth)acrylate, pentaerythritol tetravinyl ether, and crosslinking agents having two or more different reactive ends, such as, for example, (meth)allyl (meth)acrylates of the formulae:

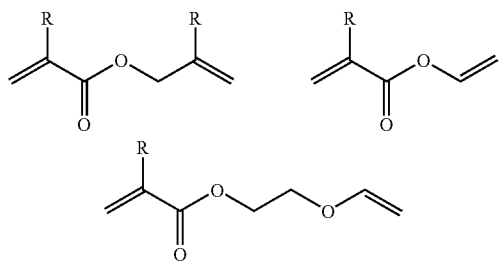

(in which R is hydrogen or methyl).

Group 2: reactive crosslinking agents which act in a crosslinking manner, but in most cases in a post-crosslinking manner, for example during warming or drying, and which are copolymerised into the core or shell polymers as copolymers.

Examples thereof are: N-methylol(meth)acrylamide, acrylamidoglycolic acid, and ethers and/or esters thereof with $C_1$- to $C_6$-alcohols, diacetoneacrylamide (DAAM), glycidyl methacrylate (GMA), methacryloyloxypropyltrimethoxysilane (MEMO), vinyltrimethoxysilane and m-isopropenylbenzyl isocyanate (TMI).

Group 3: carboxyl groups which have been incorporated into the polymer by copolymerisation of unsaturated carboxylic acids are crosslinked in a bridge-like manner via polyvalent metal ions. The unsaturated carboxylic acids employed for this purpose are preferably acrylic acid, methacrylic acid, maleic anhydride, itaconic acid and fumaric acid. Suitable metal ions are Mg, Ca, Sr, Ba, Zn, Pb, Fe, Ni, Co, Cr, Cu, Mn, Sn and Cd. Particular preference is given to Ca, Mg and Zn, Ti and Zr. In addition, monovalent metal ions, such as, for example, Na or K, are also suitable.

Group 4: post-crosslinked additives, which are taken to mean bis- or polyfunctionalised additives which react irreversibly with the polymer (by addition or preferably condensation reactions) with formation of a network. Examples thereof are compounds which contain at least two of the following reactive groups per molecule: epoxide, aziridine, isocyanate, acid chloride, carbodiimide or carbonyl groups, furthermore, for example, 3,4-dihydroxyimidazolinone and derivatives thereof (®Fixapret products from BASF).

As already explained above, post-crosslinking agents containing reactive groups, such as, for example, epoxide and isocyanate groups, require complementary reactive groups in the polymer to be crosslinked. Thus, isocyanates react, for example, with alcohols to give urethanes, with amines to give urea derivatives, while epoxides react with these complementary groups to give hydroxyethers and hydroxyamines respectively.

The term post-crosslinking is also taken to mean photochemical curing or oxidative or air- or moisture-induced curing of the systems.

The above-mentioned monomers and crosslinking agents can be combined and (co)polymerised with one another as desired and in a targeted manner in such a way that an optionally crosslinked (co)polymer having the desired refractive index and the requisite stability criteria and mechanical properties is obtained.

It is also possible additionally to copolymerise further common monomers, for example acrylates, methacrylates, vinyl esters, butadiene, ethylene or styrene, in order, for example, to set the glass transition temperature or the mechanical properties of the core and/or shell polymers as needed.

It is likewise preferred in accordance with the invention for the application of the shell of organic polymers to be carried out by grafting, preferably by emulsion polymerisation or ATR polymerisation. The methods and monomers described above can be employed correspondingly here.

In particular on use of inorganic cores, it may also be preferred for the core to be subjected to a pre-treatment which enables binding of the shell before the shell is polymerised on. This can usually consist in chemical functionalisation of the particle surface, as is known from the literature for a very wide variety of inorganic materials. It may particularly preferably involve application to the surface of chemical functions which, as reactive chain end, enable grafting-on of the shell polymers. Examples which may be mentioned in particular here are terminal double bonds, epoxy functions and polycondensable groups. The functionalisation of hydroxyl-carrying surfaces with polymers is disclosed, for example, in EP-A-337 144. Further methods for the modification of particle surfaces are well known to the person skilled in the art and are described, for example, in various textbooks, such as Unger, K. K., Porous Silica, Elsevier Scientific Publishing Company (1979).

Production of the composite materials according to the invention is preferably carried out by connecting at least one moulding which essentially consists of core/shell particles to at least one further material which determines the mechanical properties of the composite. In a preferred embodiment of this process, the connection is effected by the action of mechanical force, preferably uniaxial pressing, and/or heating.

For example, the connection of two or more layers can be achieved by uniaxial pressing at elevated temperature.

In a preferred embodiment, composite materials of this type are in the form of laminates, i.e. the moulding is a film or layer which is strongly connected to at least one further layer of another material which determines the mechanical properties of the composite.

It is likewise preferred here for the moulding which dominates the optical properties of the material to be embedded into the other material and thus to be surrounded thereby.

Preference is also given to laminates in which the moulding which dominates the optical properties of the material is embedded between two different materials. Thus, a material which determines the mechanical properties of the composite material can be applied to one side of the moulding and a transparent film which merely modifies the surface structure and hapticity of the composite material can be applied to the other side. Thus, for example, optionally structured PMMA films can be employed in order further to increase the brightness of the colour effects. By suitable structuring of such films, diffuse reflection at the mouldings which dominate the optical properties of the material can be reduced or prevented.

In another preferred embodiment of the process according to the invention, the composites are produced by coextrusion. Coextrusion produces, for example, films or sheets comprising two or more layers for packaging and as semifinished products.

There are various common coextrusion processes:

In one process variant, the materials to be extruded are mixed in the die. This process requires similar flow properties of the different materials. It is advantageous here that only one die is necessary and the coextrudate is obtained directly.

In another process variant, a separate die is required for each component. The individual extrudates are only combined, via rolls, to give the coextrudate after exiting from the dies. This process is more complex in equipment terms, but enables the coextrusion of materials having different flow characteristics.

Extrusion is also used for the production of meshes of thermoplastic materials, in which, in contrast to knotted fabrics, the contact points of warp and weft are strongly connected to one another. In this process, two counterrotating dies, each with a set of die openings arranged in a circular manner, are installed on the extruder head. When the openings of the two dies lie one above the other, only one extrudate is produced. Due to the rotation of the openings, the extrudate is divided into two individual extrudates and then re-combined on further rotation, etc. If the rotational speed of the two dies is the same, a tube with a diamond-like mesh structure is formed, which gives a flat mesh after cutting open. By variation of the slots, speeds, etc., very different meshes can be produced.

During extrusion, it is also possible to allow chemical reactions, namely polymerisation reactions of monomers or prepolymers to give thermoplastics and thermosets, crosslinking reactions or graft reactions on the shell of the core/shell particles, to take place at the same time. In order to avoid different curing rates, ram extruders and not screw or twin-screw extruders are usually used here. In the extrusion of rubbers, however, vulcanisation to give elastomers takes place in a separate process step after the extrusion.

In a production process which is preferred in accordance with the invention, composites of this type are produced by casting in or back moulding. In both cases, the moulding, essentially consisting of core/shell particles, is placed in the mould, and the at least one other material is either poured in in the form of a melt or precursor or injected in by means of an injection-moulding apparatus. In other preferred variants, the composite materials are obtained by lamination of individual layers. The connection of the materials can then be produced by an adhesive operation and/or a pressing operation.

As has been shown, it is likewise possible and likewise preferred in accordance with the invention to process the core/shell particles simultaneously with the other material in an injection-moulding apparatus. It may be particularly preferred here for chalk or other finely particulate release agents, such as, for example, silica, to be added to the core/shell particles as assistants for reducing the tack.

In a particularly preferred embodiment of the present invention, laminate-form composites can preferably be processed further by thermoforming.

If the composite materials according to the invention are to be processed by thermoforming, it is necessary for the material which determines the mechanical properties of the composite material to be a thermoplastic which is suitable for thermoforming. Suitable plastics are typically those which can be processed in the soft elastic state. Preferred thermoplastics can be processed even at temperatures below 200° C. For example, mention may be made here of thermoplastic polyolefins, such as various polystyrene grades, such as standard polystyrene, high-impact polystyrene, polystyrene foams or copolymers of styrene with other monomers, such as acrylonitrile or acrylonitrile-butadiene or acrylonitrile-styrene-acrylate.

Furthermore, thermoforming in the sense of the present invention can be carried out using usual polymers, such as polyvinyl chloride, polyethylene, polypropylene, polymethyl methacrylate, polyoxymethylene, polycarbonate, polyester carbonate, polyphenylene ether, polyamides, acrylonitrile-methacrylate-butadiene copolymers, cellulose (di) acetate and generally also thermoplastic elastomers, such as styrene-butadiene-styrene block copolymers, thermoplastic olefin elastomers made from ethylene and propylene; thermoplastic polyurethane elastomers; thermoplastic elastomers based on polyester or polyether, and polyamides.

During thermoforming, the laminate-form composite material (semi-finished product) is heated until the material which determines the mechanical properties of the composite is soft and elastic and deforms under low forces. The material is then cooled to below the freezing range with continuous deformation force. Typical heating sources for such processes are infrared emitters, heating cabinets, hot-air streams, gas flames or heated liquids. The thermoforming can be carried out as pressure forming, embossing or by application of vacuum, so-called deep drawing, or excess pressure ("blowing into free space"). Folding, bending, stretching or shrinking of the composite material can also be employed for thermoforming of the material. Techniques of this type are well known to the person skilled in the art of polymer processing and can be found, for example, in A. Franck "Kunststoff-Kompendium" [Plastics Compendium], Vogel-Verlag, 1996, Chapter 4 "Kunststoffverarbeitung" [Plastics Processing]. A thermoforming method which is particularly preferred in accordance with the invention is deep drawing.

The composite materials according to the invention can also be comminuted by cutting or breaking and, if desired, subsequent grinding to give pigments of suitable size. This operation can be carried out, for example, in a continuous belt process. These pigments can then be used for the pigmentation of surface coatings, powder coatings, paints, printing inks, plastics and cosmetic formulations, such as, for example, of lipsticks, nail varnishes, cosmetic sticks, compact powders, make-ups, shampoos and loose powders and gels. The concentration of the pigment in the application system to be pigmented is generally between 0.1 and 70% by weight, preferably between 0.1 and 50% by weight and in particular between 1.0 and 20% by weight, based on the total solids content of the system. It is generally dependent on the specific application. Plastics usually comprise the pigment according to the invention in amounts of from 0.01 to 50% by weight, preferably from 0.01 to 25% by weight, in particular from 0.1 to 7% by weight, based on the plastic composition. In the coatings area, the pigment mixture is employed in amounts of from 0.1 to 30% by weight, preferably from 1 to 10% by weight, based on the coating dispersion. In the pigmentation of binder systems, for example for paints and printing inks for gravure printing, offset printing or screen printing, or as precursor for printing inks, for example in the form of highly pigmented pastes, granules, pellets, etc., pigment mixtures with spherical colorants, such as, for example, $TiO_2$, carbon black, chromium oxide, iron oxide, and organic "coloured pigments", have proven particularly suitable. The pigment is generally incorporated into the printing ink in amounts of 2-35% by weight, preferably 5-25% by weight and in particular 8-20% by weight. Offset printing inks can comprise the pigment in amounts of up to 40% by weight or more. The precursors for printing inks, for example in the form of granules, as pellets, briquettes, etc., comprise up to 95% by weight of the pigment according to the invention in addition to the binder and additives. The invention thus also relates to pigments which are obtainable from the composite materials according to the invention and formulations which comprise the pigment according to the invention.

The composite materials can be incorporated into surfaces, such as smart cards, banknotes, OEM products, etc, as security features. The security feature is in these cases the viewing angle-dependent reflection or transmission colour, i.e. the angle- and wavelength-resolved spectrum of the composite materials.

To this end, the core/shell particles can be applied (laminated) into the particular product as a thin film or applied to the particular product in the form of pigments in a formulation. The formulations can consist, for example, of steel plate inks (pigment size: 20-25 μm) or screen printing inks (pigment size: 70-80 μm).

It is also possible to refine these composite materials further by painting or using various printing methods, such as, for example, pad printing, screen printing or spray methods. The refining can take place either on the surface comprising core/shell particles or on the surface of the material which influences the mechanical properties.

The following examples are intended to explain the invention in greater detail without limiting it.

EXAMPLES

Abbreviations used:
BDDA butane-1,4-diol diacrylate
SDS dodecyl sulfate sodium salt
SDTH sodium dithionite
APS ammonium peroxodisulfate
KOH potassium hydroxide
ALMA allyl methacrylate
MMA methyl methacrylate
EA ethyl acrylate Example 1

Production of Core/shell Particles

A mixture, held at 4° C., consisting of 217 g of water, 0.4 g of butanediol diacrylate, 3.6 g of styrene (BASF, destabilised) and 80 mg of sodium dodecylsulfate (SDS; Merck) is introduced into a stirred reactor, pre-heated to 75° C., fitted with propeller stirrer, argon protective-gas inlet and reflux condenser, and dispersed with vigorous stirring. Directly after the introduction, the reaction is initiated by direct successive addition of 50 mg of sodium dithionite (Merck), 250 mg of ammonium peroxodisulfate (Merck) and a further 50 mg of sodium dithionite (Merck), in each case dissolved in 5 g of water. After 10 minutes, a monomer emulsion comprising 6.6 g of butanediol diacrylate, 59.4 g of styrene (BASF, destabilised), 0.3 g of SDS, 0.1 g of KOH and 90 g of water is metered in continuously over a period of 210 minutes. The reactor contents are stirred for 30 minutes without further addition. A second monomer emulsion comprising 3 g of allyl methacrylate, 27 g of methyl methacrylate (BASF, destabilised), 0.15 g of SDS (Merck) and 40 g of water is subsequently metered in continuously over a period of 90 minutes. The reactor contents are subsequently stirred for 30 minutes without further addition. A monomer emulsion comprising 130 g of ethyl acrylate (BASF), 139 g of water and 0.33 g of SDS (Merck) is subsequently metered in continuously over a period of 180 minutes. The mixture is subsequently stirred for a further 60 minutes for virtually complete reaction of the monomers. The core/shell particles are subsequently precipitated in 1 l of methanol, 1 l of distilled water is added, and the particles are filtered off with suction and dried.

Scanning and transmission electron photomicrographs of the core/shell particles show that the particles have a particle size of 220 nm.

While carrying out the experiment analogously, the particle size of the particles can be varied via the surfactant concentration in the initially introduced mixture. Selection of corresponding amounts of surfactant gives the following particle sizes:

| Amount of surfactant [mg of SDS] | Particle size [nm] |
|---|---|
| 80 | 220 |
| 90 | 200 |
| 100 | 180 |
| 110 | 160 |

Example 2

Production of Granules of the Core/shell Particles 3 kg of the core/shell particles from Example 1 are comminuted in a cutting mill (Rapid, type: 1528) with ice cooling and subsequently mixed with 2% by weight of black pigment (Iriodin®600 or Black Mica®; Merck) or with 0.2% by weight of a coloured absorption pigment (for example PV True Blue A2R; Clariant) and suitable processing assistants (0.1% by weight of antioxidants, 0.2% by weight of UV stabilisers, 0.2% by weight of demoulding aids and 0.2% by weight of flow improvers). After 15 minutes in a tumble mixer (Engelmann; type: ELTE 650), the mixture is compounded in a single-screw extruder (Plasti-Corder; Brabender; screw diameter 19 mm with 1-hole die (3 mm)). After a cooling zone, the mixture is granulated in an A 90-5 granulator (Automatik). The granules are subsequently mixed with 0.2% by weight of release agent in the tumble mixer for 10 minutes.

Example 3a

Production of a Film From Core/shell Particles 2 g of the granules from Example 2 are heated to a temperature of 120° C. without pressure in a Collin 300P press and pressed at a pressure of 30 bar to give a film. After cooling to room temperature, the pressure is reduced again.

Example 3b

Production of a Film From Core/shell Particles 25 g of the granules from Example 2 are heated at a temperature of 150° C. for 3 minutes at a pressure of 1 bar between two polyethylene terephthalate films in a press with cassette cooling system (Dr. Collin GmbH; type: 300E), subsequently pressed at a pressure of 250 bar and a temperature of 1500 for 3 minutes and cooled to room temperature over the course of 8 minutes under a pressure of 200 bar. The polyethylene terephthalate protective films are subsequently removed.

Example 4a

Production of a Laminate by Pressing

A film from Example 3b is heated to a temperature of 150° C. without pressure with a polycarbonate sheet (d=1 mm) in a press with cassette cooling system (Dr. Collin GmbH; type: 300E) and pressed at a pressure of 250 bar to give a laminate. After cooling to room temperature, the pressure is reduced again after 8 minutes.

Example 4b

Production of a Laminate by Pressing 25 g of granules from Example 2 are heated to a temperature of 150° C. without pressure with a polycarbonate sheet (d=1 mm) between two polyethylene terephthalate films in a press with cassette cooling system (Dr. Collin GmbH; type: 300E) and pressed at a pressure of 250 bar for 3 minutes to give a laminate. The material is subsequently cooled to room temperature over the course of 8 minutes at a pressure of 200 bar without opening the press. The polyethylene terephthalate protective films are subsequently removed.

Example 5

Production of a Composite Material by Back Moulding

A film from Example 3b is laid in an injection-moulding sheet mould (diameter: 140 mm; thickness 4 mm; central gating) and fixed. Polystyrene (Polystyrol® 143E; BASF) is subsequently injected by means of a screw injection-moulding machine (Battenfeld, type: BA 1000/315 CDC Unilog B4; locking force 1000 kN; screw diameter 45 mm). (Barrel temperature: 175° C., mould temperature: 40° C.; back pressure of feed: 90 bar; screw peripheral velocity during feeding: 100 mm/s; injection rate: 50 cm$^3$/s over 1.7 s; injection pressure: 830 bar). When a pressure of 830 bar has been reached, the pressure is set to 600 bar and held for 15 s. A remaining cooling time of 40 s is maintained before the mould is emptied.

Example 6

Production of a Half Shell by Thermoforming a Laminate

A laminate from Example 4b is heated on one side with an infrared emitter in a deep-drawing machine (Illing; type: U-60; frame size 600 mm×500 mm) and subsequently free formed via a frame opening of 150 mm×150 mm to give a half shell. The warming time was 100 s, the forming temperature was about 180° C.

Example 7

Production of a Moulded Part by Thermoforming a Laminate

A laminate from Example 4b is converted into a moulded part (cup) in a deep-drawing machine (Illing, type U-60; frame size 600 mm×500 mm) using a corresponding mould insert. For this purpose, the laminate is clamped into the frame, heated to a forming temperature of about 180° C. with the aid of an IR emitter in a time of 100 s and inflated to give a half shell. A mould insert in the form of a yoghurt pot is then moved into the half shell from below. The volume between the half shell and the mould is evacuated via small apertures in the mould insert, causing the half shell to be drawn onto the mould with an accurate fit.

Example 8

Production of Core/shell Particles Having a Silicon Dioxide Core (150 nm)

66 g of Monospher® 150 suspension (Merck; solids content 38% by weight, corresponding to 25 g of SiO$_2$ monospheres; average particle size 150 nm; standard deviation of the average particle size<5%) are introduced with 354 g of water into a stirred twin-wall reactor, held at 25° C., fitted with argon protective-gas inlet, reflux condenser and propeller stirrer, a solution of 450 mg of aluminium trichloride hexahydrate (Acros) in 50 ml is added, and the mixture is stirred vigorously for 30 minutes. A solution of 40 mg of sodium dodecylsulfate in 50 g of water is subsequently added, and the mixture is stirred vigorously for a further 30 minutes.

50 mg of sodium dithionite, 150 mg of ammonium peroxodisulfate and a further 50 mg of sodium dithionite, in each case in 5 g of water, are then added directly one after the other. Immediately after the addition, the reactor is heated to 75° C., and 25 g of ethyl acrylate are metered in continuously over a period of 120 minutes. The reactor contents are subsequently stirred at 75° C. for a further 60 minutes for complete reaction of the monomer.

The resultant hybrid material is filtered off and dried and processed further in accordance with Examples 2 to 7.

Example 9

Production of Core/shell Particles Having a Silicon Dioxide Core (250 nm)

60 g of Monospher® 250 (Merck; average particle size 250 nm; standard deviation of the average particle size<5%) are suspended. 3.2 g of AlCl$_3$ and 1.9 g of Na$_2$SO$_4$ are added to the suspension. 5.9 g of 3-methacryloxypropyltrimethoxysilane are added dropwise at pH=2.6 and 75° C. At 75° C., a pH=8.5 is set by addition of, sodium hydroxide solution.

After hydrolysis, the resultant powder is separated off and dried. 90 g of water and 50 mg of sodium dodecylsulfate are added to 10 g of the functionalised Monospher® 250, and the mixture is stirred vigorously for 1 day for dispersal. The suspension is subsequently dispersed in a homogeniser (Niro Soavi, NS1001L). 70 g of water are added to the dispersion, and the mixture is cooled to 4° C.

The dispersion is subsequently introduced into a stirred twin-wall reactor fitted with argon protective-gas inlet, reflux condenser and propeller stirrer. 50 mg of sodium dithionite, 150 mg of ammonium peroxodisulfate and a further 50 mg of sodium dithionite, in each case in 5 g of water, are then added directly one after the other. Immediately after the addition, the reactor is heated to 75° C., and an emulsion of 10 g of ethyl acrylate and 20 g of water is metered in continuously over a period of 120 minutes. The reactor contents are subsequently stirred at 75° C. for a further 60 minutes for complete reaction of the monomer.

The resultant hybrid material is precipitated in a solution of 10 g of calcium chloride and 500 g of water, filtered off and dried and processed further in accordance with Examples 2 to 7.

Example 10

Production of Core/shell Particles having a Silicon Dioxide Core (100 nm)

66 g of Monospher® 100 suspension (Merck; solids content 38% by weight, corresponding to 25 g of $SiO_2$ monospheres; average particle size 150 nm; standard deviation of the average particle size<5%) are introduced with 354 g of water into a stirred twin-wall reactor, held at 25° C., fitted with argon protective-gas inlet, reflux condenser and propeller stirrer, a solution of 450 mg of aluminium trichloride hexahydrate (Acros) in 50 ml is added, and the mixture is stirred vigorously for 30 minutes. A solution of 40 mg of sodium dodecylsulfate in 50 g of water is subsequently added, and the mixture is stirred vigorously for a further 30 minutes.

50 mg of sodium dithionite, 150 mg of ammonium peroxodisulfate and a further 50 mg of sodium dithionite, in each case in 5 g of water, are then added directly one after the other. Immediately after the addition, the reactor is heated to 75° C., and 25 g of ethyl acrylate are metered in continuously over a period of 120 minutes. The reactor contents are subsequently stirred at 75° C. for a further 60 minutes for complete reaction of the monomer.

The resultant hybrid material is filtered off and dried and processed further in accordance with Examples 2 to 7.

Example 11

Production of Core/shell Particles Having a Core Built up From Silicon Dioxide and an Outer Sheath of Titanium Dioxide 80 g of Monospher® 100 (monodisperse silicon dioxide beads having a mean size of 100 nm with a standard deviation of<5%) from Merck KGaA are dispersed in 800 ml of ethanol at 40° C. A freshly prepared solution consisting of 50 g of tetraethyl orthotitanate (Merck KGaA) and 810 ml of ethanol is metered into the Monospher/ethanol dispersion together with deionised water with vigorous stirring. The metering is initially carried out over a period of 5 minutes at a dropwise addition rate of 0.03 ml/min (titanate solution) or 0.72 ml/min. The titanate solution is then added at 0.7 ml/min and the water at 0.03 ml/min until the corresponding containers are completely empty. For further processing, the ethanolic dispersion is stirred under reflux at 70° C. with cooling, and 2 g of methacryloxypropyl-trimethoxysilane (ABCR), dissolved in 10 ml of ethanol, are added over a period of 15 minutes. After the mixture has been refluxed overnight, the resultant powder is separated off and dried. 90 g of water and 50 mg of sodium dodecylsulfate are added to 10 g of the functionalised silicon dioxide/titanium dioxide hybrid particles, and the mixture is stirred vigorously for 1 day for dispersal. The suspension is subsequently dispersed in a homogeniser (Niro Soavi, NS1001L). 70 g of water are added to the dispersion, and the mixture is cooled to 4° C.

The dispersion is subsequently introduced into a stirred twin-wall reactor with argon protective-gas inlet, reflux condenser and propeller stirrer. 50 mg of sodium dithionite, 150 mg of ammonium peroxodisulfate and a further 50 mg of sodium dithionite, in each case in 5 g of water, are then added directly one after the other. Immediately after the addition, the reactor is heated to 75° C., and an emulsion of 10 g of ethyl acrylate and 20 g of water is metered in continuously over a period of 120 minutes. The reactor contents are subsequently stirred at 75° C. for a further 60 minutes for complete reaction of the monomer.

The resultant hybrid material is precipitated in a solution of 10 g of calcium chloride and 500 g of water, filtered off and dried and processed further in accordance with Examples 2 to 7.

Example 12

Production of Core/shell Particles in a 5 l Reactor

A mixture, held at 40° C., consisting of 1519 g of deionised water, 2.8 g of BDDA, 25.2 g of styrene and 1030 mg of SDS is introduced into a 5 l jacketed reactor, heated to 75° C., fitted with double-propeller stirrer, argon protective-gas inlet and reflux condenser, and dispersed with vigorous stirring. The reaction is immediately initiated by successive injection of 350 mg of SDTH, 1.75 g of APS and a further 350 mg of SDTH, in each case dissolved in about 20 ml of water. The injection is carried out by means of disposable syringes. After 20 minutes, a monomer emulsion comprising 56.7 g of BDDA, 510.3 g of styrene, 2.625 g of SDS, 0.7 g of KOH and 770 g of water is metered in continuously over a period of 120 minutes via a rotary piston pump. The reactor contents are stirred for 30 minutes without further addition. A second monomer emulsion comprising 10.5 g of ALMA, 94.50 g of methyl methacrylate, 0.525 g of SDS and 140 g of water is subsequently metered in continuously over a period of 30 minutes via the rotary piston pump. After about 15 minutes, 350 mg of APS are added, and the mixture is then stirred for a further 15 minutes. A third monomer emulsion comprising 900 g of EA, 2.475 g of SDS and 900 g of water is then metered in continuously over a period of 240 minutes via the rotary piston pump. The mixture is subsequently stirred for a further 120 minutes. Before and after each initially introduced mixture change, argon is passed in for about half a minute. Next day, the reactor is heated to 95° C., and a steam distillation is carried out. The core/shell particles are subsequently precipitated in 4 l of ethanol, washed with 5% calcium chloride solution, filtered off and dried and processed further as described in Examples 2 to 7. Mouldings or composite materials having a colour effect (colour flop) in the red-green region are obtained.

Example 13

Production of Core/shell Particles Having a Butyl Acrylate Shell

A mixture, held at 4° C., consisting of 217 g of water, 0.4 g of butanediol diacrylate (Merck, destabilised), 3.6 g of styrene (BASF, destabilised) and 80 mg of sodium dodecylsulfate (SDS; Merck) is introduced into a stirred reactor, pre-heated to 75° C., fitted with propeller stirrer, argon protective-gas inlet and reflux condenser, and dispersed with vigorous stirring. Immediately after the introduction, the reaction is initiated by direct successive addition of 50 mg of sodium dithionite (Merck), 250 mg of ammonium peroxodisulfate (Merck) and a further 50 mg of sodium dithionite (Merck), in each case dissolved in 5 g of water. After 10 minutes, a monomer emulsion comprising 6.6 g of butanediol diacrylate (Merck, destabilised), 59.4 g of styrene (BASF, destabilised), 0.3 g of SDS, 0.1 g of KOH and 90 g of water is metered in continuously over a period of 210 minutes. The reactor contents are stirred for 30-minutes without further addition. A second monomer emulsion comprising 3 g of allyl methacrylate (Merck, destabilised), 27 g of methyl methacrylate (BASF, destabilised), 0.15 g of SDS (Merck) and 40 g of water is subsequently metered in continuously over a period of 90 minutes. The reactor contents are subsequently stirred for 30 minutes without further addition. A monomer emulsion comprising 130 g of butyl acrylate (Merck, destabilised), 139 g of water and 0.33 g of SDS (Merck) is subsequently metered in continuously over a period of 180 minutes. The mixture is subsequently stirred for a further 60 minutes for virtually complete reaction of the monomers. The core/shell particles are subsequently precipitated in 1 l of methanol, 1 l of distilled water is added, and the particles are filtered off with suction, dried and processed further as described in Examples 2 to 7.

Example 14

Production of Core/shell Particles Having an Ethyl Acrylate/Butyl Acrylate Shell A mixture, held at 4° C., consisting of 217 g of water, 0.4 g of butanediol diacrylate (Merck, destabilised), 3.6 g of styrene (BASF, destabilised) and 60 mg of sodium dodecylsulfate (SDS; Merck) is introduced into a stirred reactor, pre-heated to 75° C., fitted with propeller stirrer, argon protective-gas inlet and reflux condenser, and dispersed with vigorous stirring. Immediately after the introduction, the reaction is initiated by direct successive addition of 50 mg of sodium dithionite (Merck), 300 mg of ammonium peroxodisulfate (Merck) and a further 50 mg of sodium dithionite (Merck), in each case dissolved in 5 g of water. After 10 minutes, a monomer emulsion comprising 8.1 g of butanediol diacrylate (Merck, destabilised), 72.9 g of styrene (BASF, destabilised), 0.375 g of SDS, 0.1 g of KOH and 110 g of water is metered in continuously over a period of 150 minutes. The reactor contents are stirred for 30 minutes without further addition. A second monomer emulsion comprising 1.5 g of allyl methacrylate (Merck, destabilised), 13.5 g of methyl methacrylate (BASF, destabilised), 0.075 g of SDS (Merck) and 20 g of water is subsequently metered in continuously over a period of 45 minutes. The reactor contents are subsequently stirred for 30 minutes without further addition. 50 mg of APS dissolved in 5 g of water are subsequently added. A monomer emulsion comprising 59.4 g of ethyl acrylate (Merck, destabilised), 59.4 g of butyl acrylate, 1.2 g of acrylic acid, 120 g of water and 0.33 g of SDS (Merck) is subsequently metered in continuously over a period of 240 minutes. The mixture is subsequently stirred for a further 60 minutes for virtually complete reaction of the monomers. The core/shell particles are subsequently precipitated in 1 l of methanol, 1 l of distilled water is added, and the particles are filtered off with suction and dried and processed further as described in Examples 2 to 7.

The invention claimed is:

1. A composite material having an optical effect comprising at least one moulding which consists essentially of core/shell particles whose shell forms a matrix and whose core is essentially solid and has an essentially monodisperse size distribution, where a difference exists between the refractive indices of the core material and of the shell material, wherein the shell in the core/shell particles is connected to the core via an interlayer, and at least one further material which determines the mechanical properties of the composite.

2. A composite material according to claim 1, wherein at least one contrast material is included in the at least one moulding which essentially consists of core/shell particles, where the at least one contrast material is a pigment.

3. A composite material according to claim 1, wherein the core/shell particles have a mean particle diameter of 5 nm to about 2000 nm.

4. A composite material according to claim 1, wherein the difference between the refractive indices of the core material and shell material is at least 0.001.

5. A composite material according to claim 1, wherein the at least one moulding which essentially consists of core/shell particles is in the form of a layer.

6. A composite material according to claim 1, wherein the at least one further material which determines the mechanical properties of the composite essentially consists of polymers.

7. A composite material according to claim 1, which is in the form of a laminate, and the at least one further material which determines the mechanical properties of the composite is processable at a temperature below 200° C.

8. A composite material according claim 1, wherein the at least one further material which determines the mechanical properties of the composite essentially consists of rubber polymers.

9. A process for preparing a composite material having an optical effect according to claim 1, comprising connecting the at least one moulding to the at least one further material which determines the mechanical properties of the composite.

10. A process for preparing a composite material according to claim 9, wherein the connecting is achieved by the action of mechanical force and/or heating.

11. A process for preparing a composite material according claim 9, wherein the connecting is achieved by uniaxial pressing.

12. A process for preparing a composite material according to claim 9, wherein the connecting is achieved by casting-in or back moulding.

13. A process for preparing a composite material according to claim 9, wherein the connecting is further processed by thermoforming or deep drawing.

14. A process for preparing a composite material according to claim 9, wherein the connecting is achieved by coextrusion.

15. A composite material according to claim 2, wherein the pigment is an absorption pigment.

16. A composite material according to claim 2, wherein the pigment is a black pigment.

17. A composite material according to claim 1, wherein the core/shell particles have a mean particle diameter of about 5 to 20 nm or about 50 to 500 nm.

18. A composite material according to claim 1, wherein the difference between the refractive indices of the core material and shell material is at least 0.01.

19. A composite material according to claim 1, wherein the difference between the refractive indices of the core material and shell material is at least 0.1.

20. A composite material according to claim 1, wherein the at least one further material which determines the mechanical properties of the composite essentially consists of thermoplastic polymers.

21. A composite material according to claim 1, wherein the shell material is filmable.

22. A process for preparing a composite material according to claim 9, wherein the shell material is filmable.

* * * * *